Figure 1:
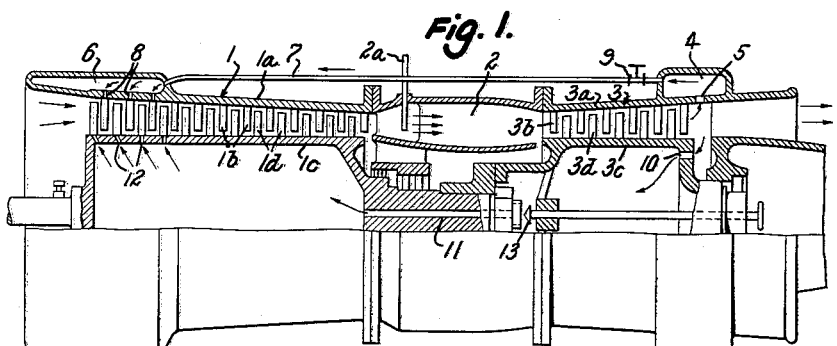

June 3, 1952

A. MEYER 2,599,470

AXIAL FLOW COMPRESSOR, PARTICULARLY
FOR COMBUSTION GAS TURBINE PLANTS
Filed July 20, 1948

Inventor
Adolf Meyer
Pierce Scheffler & Parker.
Attorneys

Patented June 3, 1952

2,599,470

UNITED STATES PATENT OFFICE 2,599,470

AXIAL FLOW COMPRESSOR, PARTICULARLY FOR COMBUSTION GAS TURBINE PLANTS

Adolf Meyer, Kusnacht, near Zurich, Switzerland, assignor to Aktiengesellschaft Brown, Boveri & Cie, Baden, Switzerland, a joint-stock company Application July 20, 1948, Serial No. 39,716
In Switzerland October 22, 1947

5 Claims. (Cl. 60—39.09)

This invention relates to compressors and particularly those of the axial flow type used in conjunction with combustion gas turbines to provide power plants for locomotives, aircraft and other mobile craft.

As is well known, the volume of air required to be compressed for driving the gas turbine is enormous, and when the air supplied to the compressor unit is very cold as will often be the case during winter or when operating at high altitudes there is an ever present danger of ice formation on the compressor surfaces, especially upon the first few stages, i. e. rows of stator and rotor vanes at the compressor entrance. As the ice builds up on the vanes, the cross section of the air passages through these stages of the compressor are correspondingly reduced with the result that the air volume is lowered and the efficiency of the plant falls off. Under severe icing conditions, the chocking off of the air supply from the compressor outlet to the combustion chamber of the plant may even be so great as to cause complete failure of the plant.

The object of this invention is to provide an improved arrangement for preventing formation of ice in the compressor. Other solutions to this vexing problem have been proposed in the past but none have proved entirely satisfactory. For example, it has been suggested that the entire supply of air to the compressor be heated before reaching the compressor. While this remedy does remove the danger of icing, it also undesirably decreases the efficiency of the compressor and hence that of the whole plant. Compressor efficiency should be maintained as high as possible and this is especially necessary in the case of combustion gas turbines since the effective power output of the plant for driving a load is represented by the difference between the total power delivered by the turbine element and the power taken from the turbine to drive the compressor, and the latter even when cooled air is used is already about three times as great as the effective power delivered by the plant. It is therefore highly expedient that the air be heated only to the extent necessary to prevent icing in the compressor. So far, this desired objective has not been attained.

This invention, however, proposes an entirely different approach to the problem which has none of the disadvantages of the past proposals. It will prevent icing and yet require a minimum of heat transfer to the fluid being compressed, thereby attaining the result desired without appreciably lowering the efficiency of the power plant. Specifically, the invention resides in a new arrangement for preventing ice formation by using hollow vanes and causing a gaseous agent, at a temperature above that at which ice can be expected to form, to flow over the exterior surfaces of the vanes of at least the first stage of the compressor in such manner that the layer of the agent in contact with the vanes is continuously replaced. Thus the actual surface of the vanes is effectively isolated from the cold incoming air to be compressed by the constantly renewed layer of the warmed gaseous agent and icing is prevented with but little decrease in efficiency.

In a gas turbine plant, the exhaust gases from the turbine are ideally suited for use as the gaseous agent. However, in lieu of exhaust gases, air from a later stage of the compressor can be led back to the initial stage or stages to which ice prevention is applied, such air having been heated by virtue of the compression process in the preceding stages of the compressor. The automatic increase in temperature of air as it passes through the various stages of an axial flow compressor is about 8° centigrade per stage. Hence for example in aircraft installations, the compressor stage at which air will be tapped off to furnish the fluid layer to be circulated over the surfaces of the vanes at the initial stage of the compressor can be so chosen with reference to the temperature of the cold air expected to be encountered that the required heating effect, and no more, is produced thereby preventing any appreciable drop in efficiency.

Another object of the invention is to warm up the vanes of the initial stages of the compressor unit of a combustion gas turbine plant and simultaneously cool down the vanes of all stages of the turbine unit of such plant by circulation of a gaseous medium over the exterior surfaces of the compressor and turbine vanes, the same gaseous agent being used for both purposes.

Another object of the invention is to provide for warming up the rotor vanes of a compressor of the axial flow type without heating up the remaining stages of the rotor.

The foregoing as well as other objects and advantages to be derived from the invention will become apparent from the following description when considered with the accompanying drawing which illustrates several practical structural arrangements for carrying out the novel method.

Figure 2:
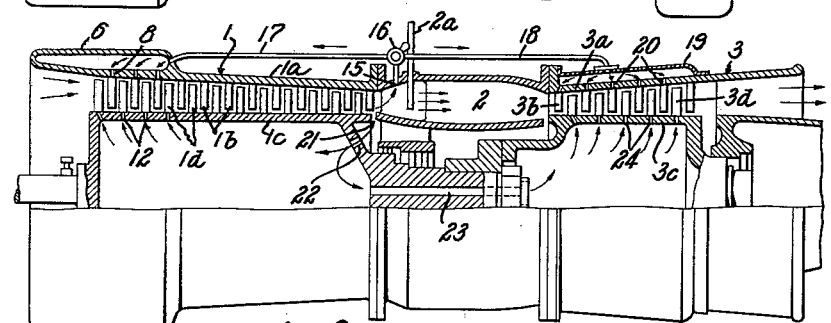
Figures 3, 4:
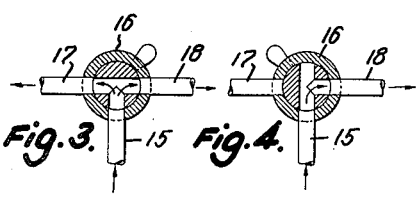
Figure 5:
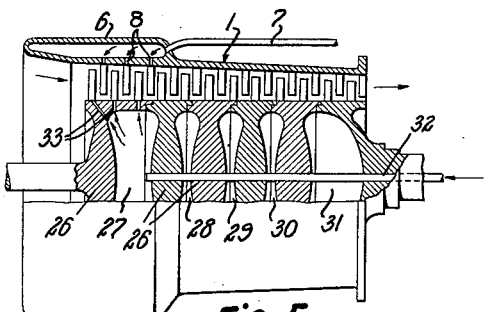
Figure 6:
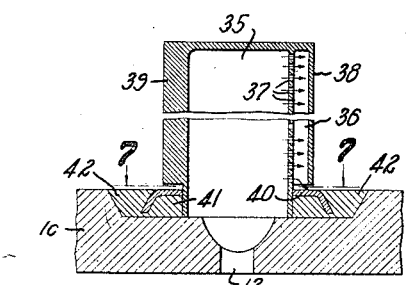
Figure 7:
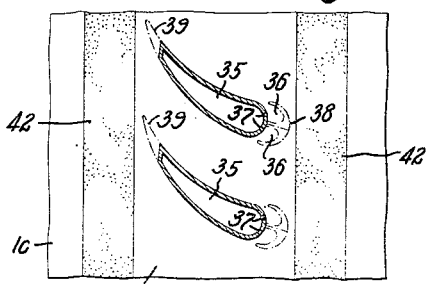

In the accompanying drawing, Fig. 1, a view in longitudinal axial section of a combustion gas turbine plant, illustrates one embodiment of the invention wherein exhaust gases from the turbine component of the plant are used as a source of gaseous fluid for providing the ice preventing film over the vanes of the compressor component; Fig. 2, also a view in longitudinal axial section of the same basic plant shows a modified arrangement wherein the ice preventing fluid is constituted by compressed air taken from the latter stages of the compressor, this air also being used for the additional purpose of cooling down the vanes of the turbine component to prevent overheating; Figs. 3 and 4 are detail views of a valve arrangement employed in the Fig. 2 construction for selectively distributing the compressed air to the vanes of the compressor and/or turbine components; Fig. 5 is a view in longitudinal axial section illustrating an application of the invention to a modified form of compressor unit; Fig. 6 is a longitudinal vertical section showing a hollow blade and mounting construction suitable for use in carrying out the invention; and Fig. 7 is a horizontal section taken on line 7—7 of Fig. 6.

Referring now to the drawing, and particularly to Fig. 1, the gas turbine plant there pictured is basically conventional, consisting of an axial type compressor 1, combustion chamber 2 and gas turbine 3 arranged in-line and in that order along the axis of the plant. Compressor 1 includes a stator 1a having a plurality of rows or stages of stationary vanes 1b, and rotor 1c having a plurality of rows of movable vanes 1d interleaved with the rows of stationary vanes 1b. The combustion chamber 2 is stationary, this chamber taking in compressed air from compressor 1, adding energy to it by the process of combustion of fuel admitted through pipe 2a and delivering the products of combustion to gas turbine 3 which, like compressor 1, includes a stator 3a having a plurality of rows or stages of stationary vanes 3b and rotor 3c also provided with a plurality of rows of rotatable vanes 3d interleaved with the rows of stationary vanes 3b. The rotor elements of the compressor and turbine components are united and are suitably mounted for rotation on a horizontal axis.

Following the last stages of the turbine 3, an annular chamber 4 is provided. This chamber which surrounds the stator 3a, receives a portion of the hot exhaust gases from the interior of the turbine through one or more ports 5. Compressor 1 is similarly provided with an annular chamber 6 surrounding the initial stages of stator 1a and which is placed in communication with chamber 4 by means of pipe 7. Passageways 8 extend from chamber 6 through the wall of stator 1a into the interior of the initial stages (the first three in the illustrated construction) of the stationary vanes 1b which are made hollow for this purpose and provided with one or more orifices for directing gas flow over the exterior surfaces of the vanes. Various structural variations for the hollow vanes are possible, one of which is shown in my prior U. S. Patent No. 2,220,420.

Another hollow vane construction suitable for this purpose is shown in U. S. Patent No. 2,236,426.

Thus, a portion of the hot gases tapped off from the exhaust end of turbine 3 flow into chamber 4, thence through pipe 7 into chamber 6 and from the latter into the hollow stator vanes 1b where the gases are then distributed over the exterior surfaces of the latter as a constantly renewing protective film which prevents the cold air coming into the compressor from icing upon the stator vanes. A valve 9 can be inserted in pipe 7 to regulate the volume of exhaust gas supplied to vanes 1b. Valve 9 also permits the flow of exhaust gas to the compressor vanes to be cut off completely when not needed.

If additional protection against ice prevention is found necessary the initial stages of the rotor vanes 1d may also be made hollow like those of the stator vanes and the hot exhaust gases from the exit end of turbine 3 fed through one or more ports 10 into the hollow interior of turbine rotor 3c, thence through passageway 11 into the hollow interior of rotor compressor 1c, and from the latter through ports 12 into the interior of the initial rows of hollow rotor vanes 1d, the first four rows of vanes being made hollow in the illustrated construction. For regulating the quantity of exhaust gases passed to the hollow rotor vanes 1d, a valve 13 associated with the gas inlet end to passageway 11 can be used. Like valve 9, valve 13 also permits the flow of turbine exhaust gases to the rotor vanes 1d of the compressor to be cut off completely when there is no danger of icing.

Fig. 2 illustrates a modified form of the invention wherein compressed air heated in the compressor as a result of the compression process is used as the source of warm air for bathing the exterior surfaces of the vanes in the initial stages of the compressor to prevent ice formation. This embodiment also affords an additional advantage in that this same air which although hot (about 200° C.) is still nevertheless much cooler than the very hot combustion gases (about 700° C.) to which the turbine vanes are subjected, and can thus be used to prevent the turbine vanes from overheating.

Referring now to Fig. 2, the compressor-combustion-chamber-turbine plant is seen to be basically the same as that illustrated in Fig. 1 and hence like parts on the two plants have been designated by like reference numerals. Unlike Fig. 1, however, the vanes of all stages of both the stator and rotor elements of turbine 3 are made hollow with means for distributing cooling air over their exterior surfaces. Also the air to be distributed to the stator vanes of the compressor unit for ice prevention and to the stator vanes of the turbine unit to prevent overheating is tapped off through port 15 at the outlet side of compressor 1 and passes through a three-way valve 16 into pipes 17, 18 that lead to the compressor and turbine stator vanes respectively. Distribution of air through pipe 17 to the stator vanes 1b of compressor 1 is the same as in Fig. 1. For distributing cooling air to the stator vanes 3b of turbine 3, the stator 3a is surrounded by an annular chamber 19 extending axially over all turbine stages, and ports 20 associated with each vane 3b provide the necessary communication between the interior of the vanes and the distribution chamber 19.

When valve 16 is turned to the position shown in Fig. 3, hot air through port 15 passes into both pipes 17, 18 thus heating up the stator vanes 1b of compressor 1 and cooling down the stator vanes 3b of turbine 3 simultaneously; when the valve occupies the position shown in Fig. 4, which would be the position used when there is no danger of icing at the initial stages of the compressor, hot compressed air from compressor 1 passes only to the hollow stator vanes 3b of the turbine.

Like the Fig. 1 construction, means are also provided in the Fig. 2 embodiment for also warming the rotor vanes of the initial states of the compressor, and further for cooling down the rotor vanes in all stages of the turbine. Warm air at the outlet end of compressor 1 is tapped off through ports 21, 22 into the hollow interior of compressor 1. From here, the air is distributed to the vanes 3d of the initial stages of the compressor rotor through ports 12 as in Fig. 1. Air for cooling down the rotor vanes of the turbine rotor enters the hollow interior of the latter from compressor rotor 1c through passageway 23 and there distributed to the hollow rotor vanes 3d through ports 24.

The modified compressor construction shown in Fig. 5 permits warm, ice prevention fluid to be fed to the vanes in the initial stages of the compressor rotor without heating up the entire rotor structure. Here it is seen that the compressor stator and the arrangement for preventing the formation of ice on the vanes of the initial stages of the stator is the same as that employed in Fig. 1 or 2. However, the compressor rotor is constructed differently, being made up of a series of side-by-side discs 26 so shaped as to form mutually isolated chambers 27—31 therebetween. Warm air for preventing formation of ice on the vanes of the initial stages of the rotor is conducted through an axial passageway 32 (which corresponds to passageway 11 in Fig. 1) extending through the discs 26 into the end chamber 27 and thence through ports 33 into the hollow vanes 1d on the initial three vane rows of the compressor rotor.

Figs. 6 and 7 have been included to show structural details of the hollow blade and mounting covered in my prior U. S. Patent No. 2,220,420 which as previously explained is suited for use in this invention. The construction detailed in these two views pertains only to the air inlet end of the compressor rotor 1c in the previous views but it will be understood that a like construction can be used for the hollow vanes on the compressor stator and also for the hollow vanes on both the stator and rotor elements of the turbine shown in Fig. 2.

Referring now to Figs. 6 and 7, numeral 35 designates the feed passage through the blade 1d for the turbine exhaust gases in Fig. 1 or the warmed compressed air in Fig. 2, numeral 36 designates an adjacent distribution passage for these gases which is placed in communication with feed passage 35 by a series of ports 37, and numeral 38 designates the wall of the vane 1d enclosing distribution passage 36. As shown in Fig. 6, at the open end of vane 1d, the wall 38 and the opposite edge 39 of the vane are cut away leaving only the wall enclosing feed passage 35. This end of the vane is inserted through an opening in the plate 40 and is secured thereto by the welding or soldering metal 41. The resulting structure is set into the groove in the rotor 1c and secured therein by the welding or soldering metal 42. The feed passage 35 within vane 1d is supplied with the gaseous fluid from the interior of rotor 1c through the passageways 12 shown in Figs. 1 and 2.

Fig. 7 which is a section on line 7—7 of Fig. 6, looking downward, indicates the location of the cut away portions 38 and 39 of vane 1d in dot-and-dash lines, and the arrows indicate the direction of flow of the gaseous fluid along the opposite face portions of the vane in a constantly renewed film thereby serving to keep the cold incoming air to the compressor away from the vane faces.

In conclusion, I wish it to be understood that while preferred constructional embodiments of the inventions have been presented in this application, other structural arrangements for providing and conducting warm gaseous fluid over the exterior surfaces of the stator and/or rotor vanes in the initial stages of the compressor may be devised by others without departing from the spirit and scope of the invention as defined in the appended claims.

I claim:

1. An axial flow type air compressor comprising a plurality of interleaved rows of stationary and movable vanes, the stationary and movable vanes of at least the first row at the air inlet having interior passageways with ports leading therefrom to the exterior surfaces of the vanes to distribute a film of gaseous fluid over said surfaces, and means for leading said gaseous fluid to the interior passageways of said vanes, said fluid being at a temperature above that at which ice can be expected to be formed on the vanes as a result of the low temperature of the air at the inlet side of the compressor.

2. An axial flow type compressor comprising a stator having a plurality of rows of vanes, a rotor having a plurality of rows of vanes interleaved with the rows of stator vanes, said rotor being constituted by a plurality of axially spaced discs forming mutually isolated chambers therebetween and at least the first row of vanes thereon at the air inlet having interior passageways with ports leading therefrom to the exterior surface of the vanes to distribute a film of gaseous fluid over said surface, ports placing the rotor chamber at the inlet end of the compressor in communication with the interior passageways of said first row of rotor vanes, and means for leading said gaseous fluid to such chamber, said fluid being at a temperature above that at which ice can be expected to be formed on the vanes as a result of the low temperature of the air at the inlet side of the compressor.

3. A combustion gas turbine plant including an axial flow type compressor, combustion chamber and gas turbine units, the rotor elements of said compressor and turbine being hollow and in communication with each other, and the stator and rotor vanes of at least the first row in the compressor at the air inlet having interior passageways with ports leading therefrom to the exterior surfaces of the vanes to distribute a film of gaseous fluid over said surfaces, a housing surrounding the stator element of said compressor in communication with the interior passageways of said stator vanes, ports placing the interior passageways of said rotor vanes in communication with the hollow rotor interior, and means for leading exhaust gases from said turbine to the interior of the rotor element thereof and to said housing.

4. A combustion gas turbine plant including an axial flow type compressor, combustion chamber and turbine units, the stator vanes of at least the first row in the compressor at the air inlet and the stator vanes of the turbine having interior passageways with ports leading therefrom to the exterior surface of the vanes to distribute a film of gaseous fluid over said surface, a housing surrounding said compressor in communication with said passageways of said first row of stator vanes, a housing surrounding said turbine in communication with said passageways in the stator vanes thereof, and means for leading air heated as a result of the compression process in said compressor to both of said housings.

5. A combustion gas turbine plant as defined in claim 4 wherein at least the first row of vanes on the rotor element of said compressor and the rotor vanes on the turbine are likewise provided with interior passageways having ports leading therefrom to the exterior surfaces of the vanes, and means are provided for leading air heated as a result of the compression process in said compressor to the interior passageways of said rotor vanes.

ADOLF MEYER.

REFERENCES CITED

The following references are of record in the file of this patent:

UNITED STATES PATENTS

| Number | Name | Date |
| --- | --- | --- |
| 2,404,275 | Clark | July 16, 1946 |
| 2,435,990 | Weiler | Feb. 17, 1948 |
| 2,474,068 | Sammons | June 21, 1949 |